United States Patent
Miyata et al.

(10) Patent No.: US 12,525,766 B2
(45) Date of Patent: Jan. 13, 2026

(54) LIGHT-EMITTING DEVICE, PROJECTOR, AND DISPLAY

(71) Applicant: SEIKO EPSON CORPORATION, Tokyo (JP)

(72) Inventors: Takashi Miyata, Shiojiri (JP); Yoji Kitano, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 465 days.

(21) Appl. No.: 18/177,121

(22) Filed: Mar. 2, 2023

(65) Prior Publication Data

US 2023/0283044 A1   Sep. 7, 2023

(30) Foreign Application Priority Data

Mar. 4, 2022   (JP) .................. 2022-033273

(51) Int. Cl.
  *H01S 5/042*   (2006.01)
  *H01S 5/11*    (2021.01)
  *H01S 5/343*   (2006.01)
  *H04N 9/31*    (2006.01)

(52) U.S. Cl.
  CPC ...... *H01S 5/04256* (2019.08); *H01S 5/04253* (2019.08); *H01S 5/04254* (2019.08); *H01S 5/11* (2021.01); *H01S 5/34333* (2013.01); *H04N 9/31* (2013.01)

(58) Field of Classification Search
  CPC ............. H01S 5/04256; H01S 5/04253; H01S 5/04254; H01S 5/11; H01S 5/04257; H04N 9/31; H04N 9/3161
  See application file for complete search history.

(56) References Cited

U.S. PATENT DOCUMENTS

| | | | |
|---|---|---|---|
| 2007/0041214 A1 | 2/2007 | Ha et al. | |
| 2020/0412099 A1* | 12/2020 | Miyata | H01S 5/04254 |
| 2020/0412100 A1* | 12/2020 | Miyata | H01S 5/185 |
| 2021/0096452 A1* | 4/2021 | Miyata | H10H 20/835 |
| 2021/0194209 A1* | 6/2021 | Miyata | H10H 20/832 |
| 2022/0199861 A1* | 6/2022 | Noda | G03B 21/2033 |

FOREIGN PATENT DOCUMENTS

| | | |
|---|---|---|
| JP | 2006332650 | 12/2006 |
| JP | 2021072302 | 5/2021 |
| JP | 2021100048 | 7/2021 |

* cited by examiner

*Primary Examiner* — Yuanda Zhang
(74) *Attorney, Agent, or Firm* — JCIPRNET (57) ABSTRACT

A light-emitting device including a substrate, a plurality of column portions each including a first semiconductor layer of a first conductivity type, a second semiconductor layer of a second conductivity type different from the first conductivity type, and a light-emitting layer provided between the first semiconductor layer and the second semiconductor layer, an electrode including a first electrode layer electrically coupled to the second semiconductor layer of each of the plurality of column portions, and a second electrode layer provided on an opposite side of the first electrode layer from the substrate and having an electrical resistivity lower than an electrical resistivity of the first electrode layer, wherein the first electrode layer includes a first portion in contact with the second electrode layer on the opposite side from the substrate, and a second portion not in contact with the second electrode layer on the opposite side from the substrate and having a greater thickness than the first portion.

7 Claims, 10 Drawing Sheets

LIGHT-EMITTING DEVICE, PROJECTOR, AND DISPLAY

The present application is based on, and claims priority from JP Application Serial Number 2022-033273, filed Mar. 4, 2022, the disclosure of which is hereby incorporated by reference herein in its entirety.

BACKGROUND

1. Technical Field

The present disclosure relates to a light-emitting device, a projector, and a display.

2. Related Art

A semiconductor laser is expected as a next-generation light source with high luminance. Among them, a semiconductor laser to which nanocolumns are applied is expected to realize high-power light emission with a narrow emission angle due to an effect of a photonic crystal by the nanocolumns.

For example, JP-A-2021-100048 describes a light-emitting device including a plurality of column portions and an electrode, and the electrode includes a first electrode layer coupled to the plurality of column portions and a second electrode layer coupled to the first electrode layer.

However, in the light-emitting device described in JP-A-2021-100048, a thickness of a connecting portion of the electrode to which the first electrode layer and the second electrode layer are coupled is greater than a thickness of the first electrode layer. Thus, a sheet resistance of the connecting portion of the electrode is lower than a sheet resistance of the first electrode layer. As a result, a difference in an injection current amount is generated between a column portion overlapping the connecting portion of the electrode and a column portion overlapping only the first electrode layer. When the difference in the injection current amount is generated, light emission intensity is different, and light emission unevenness occurs.

SUMMARY

An aspect of a light-emitting device according to the present disclosure includes
a substrate,
a plurality of column portions each including a first semiconductor layer of a first conductivity type, a second semiconductor layer of a second conductivity type different from the first conductivity type, and a light-emitting layer provided between the first semiconductor layer and the second semiconductor layer,
an electrode including a first electrode layer electrically coupled to the second semiconductor layer of each of the plurality of column portions, and a second electrode layer provided on an opposite side of the first electrode layer from the substrate and having an electrical resistivity lower than an electrical resistivity of the first electrode layer, and
the first electrode layer includes a first portion in contact with the second electrode layer on the opposite side from the substrate, and a second portion not in contact with the second electrode layer on the opposite side from the substrate and having a greater thickness than the first portion.

One aspect of a projector according to the present disclosure includes one aspect of the light-emitting device.

One aspect of a display according to the present disclosure includes one aspect of the light-emitting device.

DESCRIPTION OF EXEMPLARY EMBODIMENTS

Preferred exemplary embodiments of the present disclosure will be described in detail with reference to drawings hereinafter. Note that the exemplary embodiment described hereinafter is not intended to unjustly limit the content of the present disclosure as set forth in the claims. In addition, all of the configurations described hereinafter are not necessarily essential constituent requirements of the present disclosure.

1. Light-Emitting Device
1.1 Overall Configuration

Figure 1:
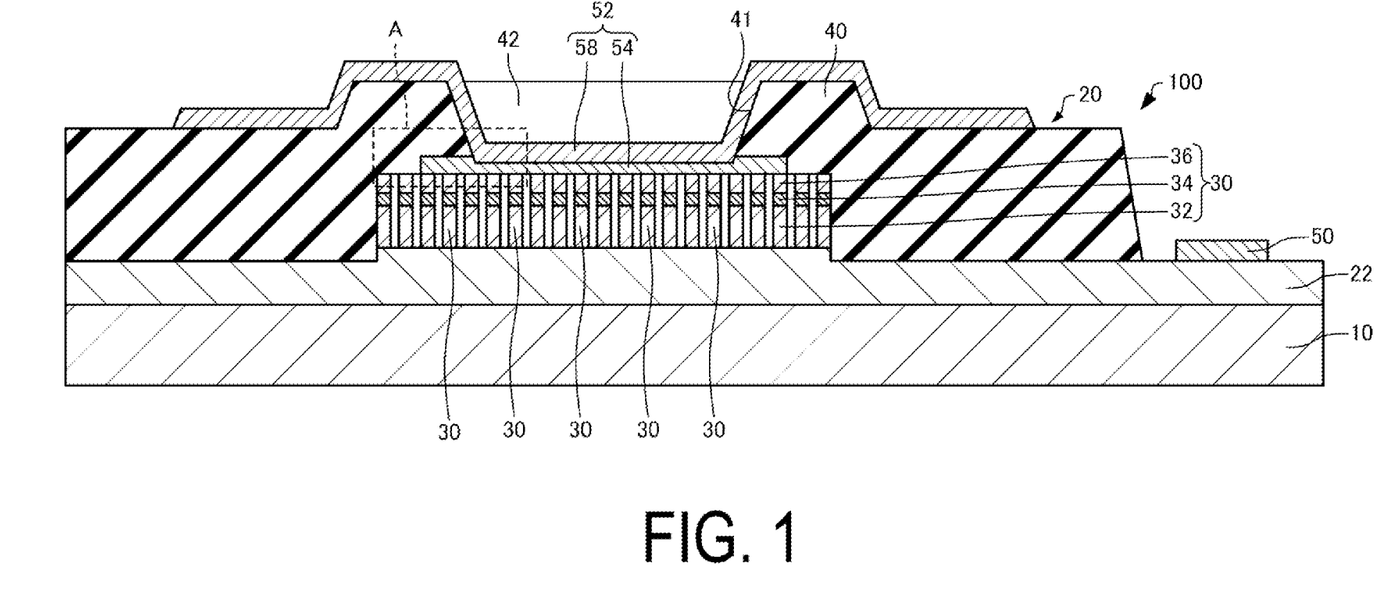
FIG. 1 is a cross-sectional view schematically illustrating a light-emitting device according to a present embodiment.
Figure 2:
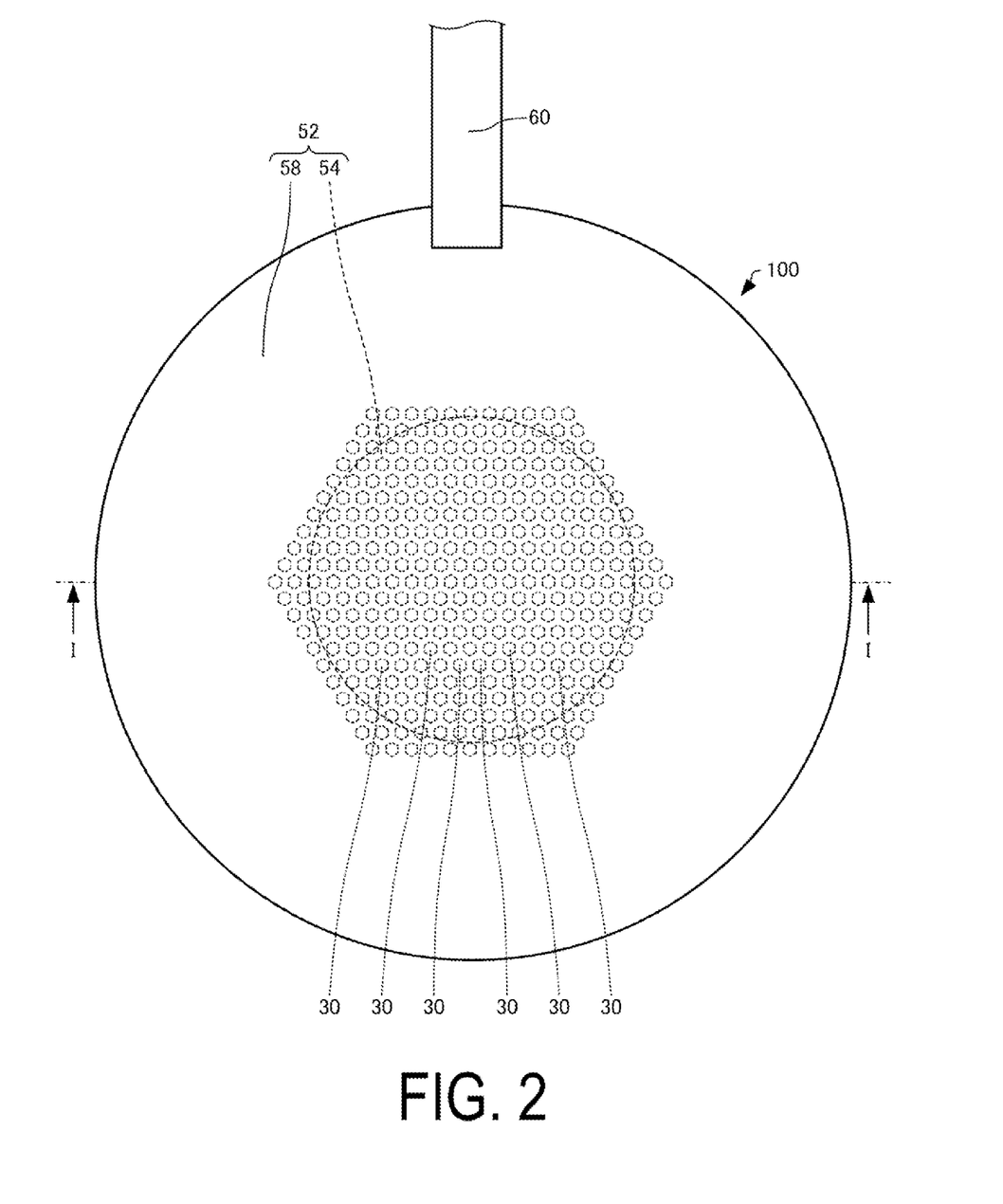
FIG. 2 is a plan view schematically illustrating the light-emitting device according to the present embodiment.

First, a light-emitting device according to the present embodiment will be described with reference to the accompanying drawings. FIG. 1 is a cross-sectional view schematically illustrating a light-emitting device 100 according to the present embodiment. FIG. 2 is a plan view schematically illustrating the light-emitting device 100 according to the present embodiment. Note that FIG. 1 is a cross-sectional view taken along a line I-I in FIG. 2.

As illustrated in FIGS. 1 and 2, the light-emitting device 100 includes, for example, a substrate 10, a stack body 20, a first electrode 50, a second electrode 52, and a wiring 60. The light-emitting device 100 is, for example, a semiconductor laser.

The substrate 10 is, for example, a Si substrate, a GaN substrate, a sapphire substrate, or a SiC substrate.

The stack body 20 is provided on the substrate 10 as illustrated in FIG. 1. In the illustrated example, the stack body 20 is provided on the substrate 10. The stack body 20 includes, for example, a buffer layer 22, a plurality of column portions 30, and an insulating layer 40. Note that, for the sake of convenience, members other than the column portions 30, the second electrode 52, and the wiring 60 are omitted in FIG. 2.

In the present specification, a description will be provided such that when a light-emitting layer 34 of the column portion 30 is set as a reference in a stacking direction of the stack body 20 (hereinafter, also referred to simply as "stacking direction"), a direction from the light-emitting layer 34 toward a second semiconductor layer 36 of the column portion 30 is referred to as "up", and a direction from the light-emitting layer 34 toward a first semiconductor layer 32 of the column portion 30 is referred to as "down". A direction orthogonal to the stacking direction is also referred to as "in-plane direction". The term "stacking direction of the stack body 20" refers to a stacking direction of the first semiconductor layer 32 and the light-emitting layer 34.

The buffer layer 22 is provided on the substrate 10. The buffer layer 22 is, for example, an n-type GaN layer doped with Si. Although not illustrated, a mask layer for growing the plurality of column portions 30 may be provided on the buffer layer 22. The mask layer is, for example, a titanium layer, a silicon oxide layer, a titanium oxide layer, or an aluminum oxide layer.

The column portions 30 are provided on the buffer layer 22. The column portion 30 has a columnar shape protruding upward from the buffer layer 22. In other words, the column portion 30 protrudes upward from the substrate 10 via the buffer layer 22. The column portion 30 is also referred to as, for example, a nano-column, a nanowire, a nanorod, or a nano-pillar. A planar shape of the column portion 30 is, for example, a polygon such as a hexagon, or a circle. In the example illustrated in FIG. 2, the planar shape of the column portion 30 is a regular hexagon.

A diameter of the column portion 30 is, for example, 50 nm or more and 500 nm or less. By setting the diameter of the column portion 30 to be 500 nm or less, the light-emitting layer 34 of a high quality crystal can be obtained, and strains inherent in the light-emitting layer 34 can be reduced. As a result, light generated by the light-emitting layer 34 can be amplified with high efficiency.

Note that the term "diameter of the column portion 30" refers to a diameter when the planar shape of the column portion 30 is the circle, and refers to a diameter of the smallest inclusion circle when the planar shape of the column portion 30 is not circle. For example, the diameter of the column portion 30 is a diameter of the smallest circle that includes a polygon when the planar shape of the column portion 30 is the polygon, and a diameter of the smallest circle including an ellipse inside when the planar shape of the column portion 30 is the ellipse.

The plurality of column portions 30 are provided. The plurality of column portions 30 are provided separated from each other. A spacing between adjacent ones of the column portions 30 is, for example, 1 nm or more and 500 nm or less. The plurality of column portions 30 are arranged in a predetermined pitch in a predetermined direction when viewed from the stacking direction. The plurality of column portions 30 are arranged in, for example, a triangular lattice shape or a square lattice shape. In the example illustrated in FIG. 2, the plurality of column portions 30 are arranged in a regular triangular lattice shape. The plurality of column portions 30 can express the effect of the photonic crystal.

Note that the term "pitch of the column portions 30" is a distance between the centers of adjacent ones of the column portions 30 in the predetermined direction. Note that the term "center of the column portion 30" refers to a center of a circle when the planar shape of the column portion 30 is the circle, and refers to a center of the smallest inclusion circle when the planar shape of the column portion 30 is not circular. For example, the center of the column portion 30 is a center of the smallest circle that includes a polygon when the planar shape of the column portion 30 is the polygon, and a center of the smallest circle including an ellipse inside when the planar shape of the column portion 30 is the ellipse.

As illustrated in FIG. 1, the column portion 30 includes the first semiconductor layer 32, the light-emitting layer 34, and the second semiconductor layer 36.

The first semiconductor layer 32 is provided on the buffer layer 22. The first semiconductor layer 32 is provided between the substrate 10 and the light-emitting layer 34. The first semiconductor layer 32 is a semiconductor layer of a first conductivity type. The first semiconductor layer 32 is, for example, an n-type GaN layer doped with Si.

The light-emitting layer 34 is provided between the first semiconductor layer 32 and the second semiconductor layer 36. The light-emitting layer 34 generates light when a current is injected. The light-emitting layer 34 includes, for example, a well layer and a barrier layer. The well layer and the barrier layer are i-type semiconductor layers that are not intentionally doped with impurities. The well layer is, for example, an InGaN layer. The barrier layer is, for example, a GaN layer. The light-emitting layer 34 has a Multiple Quantum Well (MQW) structure including the well layer and the barrier layer.

Note that the numbers of the well layers and the barrier layers included in the light-emitting layer 34 are not particularly limited. For example, only one well layer may be provided, and in this case, the light-emitting layer 34 has a Single Quantum Well (SQW) structure.

The second semiconductor layer 36 is provided on the light-emitting layer 34. The second semiconductor layer 36 is provided between the light-emitting layer 34 and the second electrode 52. The second semiconductor layer 36 is a semiconductor layer of a second conductivity type different from the first conductivity type. The second semiconductor layer 36 is, for example, a p-type GaN layer doped with Mg. The first semiconductor layer 32 and the second semiconductor layer 36 are clad layers having a function of confining light into the light-emitting layer 34.

Note that, although not illustrated, an Optical Confinement Layer (OCL) including an i-type InGaN layer and a GaN layer may be provided in at least one of between the first semiconductor layer 32 and the light-emitting layer 34, and between the light-emitting layer 34 and the second semiconductor layer 36. Additionally, the second semiconductor layer 36 may include an Electron Blocking Layer (EBL) including a p-type AlGaN layer.

In the light-emitting device 100, the p-type second semiconductor layer 36, the i-type light-emitting layer 34 that is not intentionally doped with an impurity, and the n-type first semiconductor layer 32 constitute a pin diode. In the light-emitting device 100, when a forward bias voltage of the pin diode is applied between the first electrode 50 and the second electrode 52, a current is injected into the light-emitting layer 34, and recombination between electrons and positive holes occurs in the light-emitting layer 34. This recombination causes light emission. The light generated in the light-emitting layer 34 propagates in the in-plane direction, forms a standing wave due to the effect of the photonic crystal by the plurality of column portions 30, and receives gain in the light-emitting layer 34 to oscillate laser. Then, the light-emitting device 100 emits+1st-order diffracted light and −1st-order diffracted light as laser light in the stacking direction.

Although not illustrated, a reflection layer may be provided between the substrate 10 and the buffer layer 22, or below the substrate 10. The reflection layer is, for example, a Distributed Bragg Reflector (DBR) layer. The light generated in the light-emitting layer 34 can be reflected by the reflection layer, and the light-emitting device 100 can emit light only from the second electrode 52 side.

The insulating layer 40 is provided on the opposite side of the plurality of column portions 30 from the substrate 10. In the illustrated example, the insulating layer 40 is provided on the buffer layer 22 and on a first electrode layer 54. The insulating layer 40 surrounds the plurality of column portions 30 when viewed from the stacking direction. A contact hole 42 is provided in the insulating layer 40. The contact hole 42 penetrates the insulating layer 40 in the stacking direction. The insulating layer 40 is, for example, a silicon oxide layer, a silicon nitride layer, a silicon oxynitride layer, or a polyimide layer.

The first electrode 50 is provided on the buffer layer 22. In the illustrated example, a portion of the buffer layer 22 is engraved, and the first electrode 50 is provided in the engraved portion of the buffer layer 22. The buffer layer 22 may be in ohmic contact with the first electrode 50. The first electrode 50 is electrically coupled to the first semiconductor layer 32. In the illustrated example, the first electrode 50 is electrically coupled to the first semiconductor layer 32 via the buffer layer 22. As the first electrode 50, for example, a Cr layer, a Ni layer, and an Au layer stacked in this order from the buffer layer 22 side are used. The first electrode 50 is one electrode for injecting a current into the light-emitting layer 34.

The second electrode 52 is provided on the second semiconductor layer 36. Furthermore, the second electrode 52 is provided on the insulating layer 40. The second semiconductor layer 36 may be in ohmic contact with the second electrode 52. The second electrode 52 is the other electrode for injecting a current into the light-emitting layer 34. The details of the second electrode 52 will be described below.

The wiring 60 is coupled to the second electrode 52 as illustrated in FIG. 2. The wiring 60 is provided on the insulating layer 40. The wiring 60 is coupled to a pad (not illustrated). Although not illustrated, the pad is coupled to, for example, a wire bonding and a Flexible Printed Circuit (FPC) electrically coupled to a power supply. A transistor for controlling a current flowing through wiring 60 may be provided between the power supply and the pad. The wiring 60 supplies a current to the plurality of column portions 30 via the second electrode 52. The wiring 60 may be made of a metal material such as, copper, gold, and the like or may be made of the same transparent electrode material as the second electrode layer 58. When the wiring 60 is made of the transparent electrode material, the wiring 60 may be provided integrally with the second electrode layer 58.

Note that although the InGaN-based light-emitting layer 34 has been described above, various material systems capable of emitting light when a current is injected can be used as the light-emitting layer 34 in accordance with the wavelength of the emitted light. For example, semiconductor materials such as AlGaN-based, AlGaAs-based, InGaAs-based, InGaAsP-based, InP-based, GaP-based, AlGaP-based, and the like can be used.

The light-emitting device 100 is not limited to the laser, and may be a light-emitting Diode (LED).

1.2. Second Electrode

Figure 3:
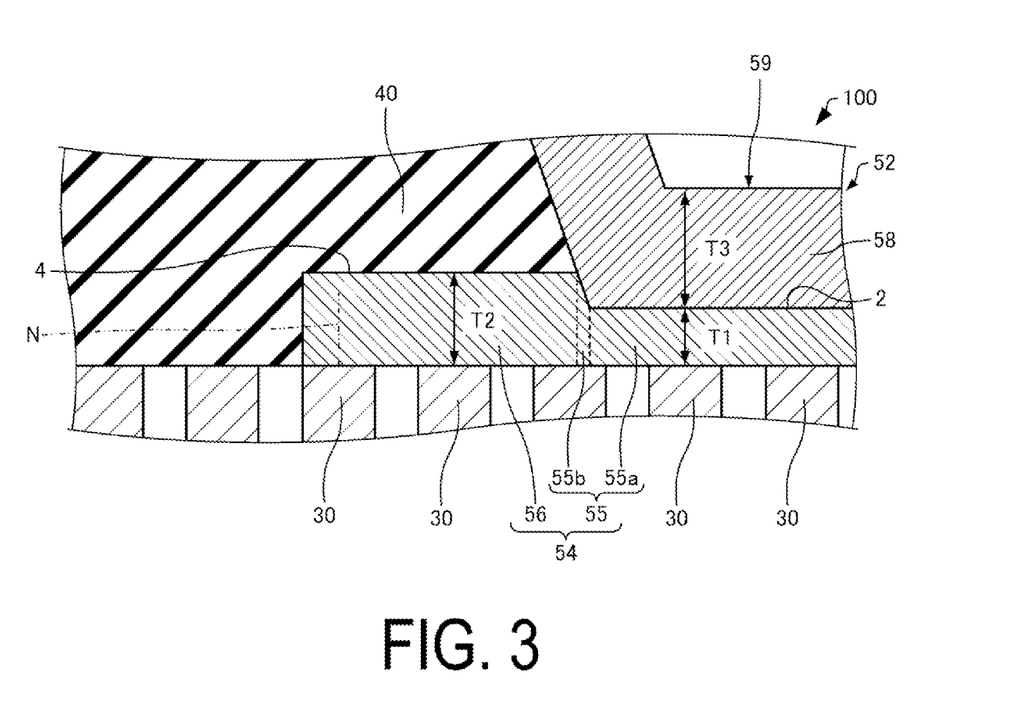
FIG. 3 is a cross-sectional view schematically illustrating the light-emitting device according to the present embodiment.

FIG. 3 is a cross-sectional view schematically illustrating the light-emitting device 100 according to the present embodiment, and is an enlarged view of a region A illustrated in FIG. 1.

As illustrated in FIGS. 1 to 3, the second electrode 52 includes a first electrode layer 54 and a second electrode layer 58.

As illustrated in FIGS. 1 and 3, the first electrode layer 54 is provided on the plurality of column portions 30. The first electrode layer 54 is provided between the plurality of column portions 30 and the second electrode layer 58. The first electrode layer 54 is electrically coupled to the second semiconductor layer 36. The first electrode layer 54 is, for example, in contact with the second semiconductor layer 36. The second semiconductor layer 36 may be in ohmic contact with the first electrode 54. In the example illustrated in FIG. 2, the shape of the first electrode layer 54 is a circle.

The first electrode layer 54 is made of, for example, a metal material. The first electrode layer 54 is formed by stacking, for example, a Pd layer, a Pt layer, an Ni layer, and an Au layer in this order from the second semiconductor layer 36 side, or formed by a single layer of a metal layer. An electrical resistivity of the first electrode layer 54 is smaller than an electrical resistivity of the second electrode layer 58. As a result, a contact resistance between the second electrode 52 and the second semiconductor layer 36 can be reduced as compared with when the second electrode layer 58 is in contact with the second semiconductor layer 36.

As illustrated in FIG. 3, the first electrode layer 54 includes a first portion 55 and a second portion 56.

The first portion 55 does not overlap the insulating layer 40 when viewed from the stacking direction. The first portion 55 is in contact with the second electrode layer 58. An upper surface 2 of the first portion 55 is in contact with the second electrode layer 58. The upper surface 2 is a surface of the first portion 55 opposite to the substrate 10. In the illustrated example, the upper surface 2 is a flat surface. The first portion 55 is in contact with the second electrode layer 58 on the opposite side from the substrate 10. The planar shape of the first portion 55 is, for example, a circle.

A thickness T1 of the first portion 55 is, for example, 5 nm or more and 100 nm or less, may be 10 nm or more and 50 nm or less, and may be 30 nm. Note that the term "thickness T1 of the first portion 55" is a size of the first portion 55 of the upper surface of the column portion 30 provided with the first portion 55 in a normal N direction, and is the smallest size. In the illustrated example, the upper surface of the column portion 30 is composed of the c-plane, and the normal N direction of the upper surface of the column portion 30 is the stacking direction. The upper surface of the column portion 30 is, for example, parallel to the upper surface of the substrate 10.

The first portion 55 includes, for example, a thickness constant portion 55a and a thickness change portion 55b. The thickness constant portion 55a has a constant thickness in the in-plane direction. The planar shape of the thickness constant portion 55a is, for example, a circle. The thickness change portion 55b is coupled to the thickness constant portion 55a and the second portion 56. The thickness change portion 55b gradually increases in thickness from the thickness constant portion 55a toward the second portion 56. The thickness of the thickness change portion 55b is greater than the thickness of the constant portion 55a. The planar shape of the thickness change portion 55b is, for example, a ring shape.

The second portion 56 surrounds the first portion 55 when viewed from the stacking direction. The planar shape of the second portion 56 is, for example, a ring shape. The second portion 56 overlaps the insulating layer 40 when viewed from the stacking direction. The second portion 56 is not in contact with the second electrode layer 58. An upper surface 4 of the second portion 56 is not in contact with the second electrode layer 58. The upper surface 4 is a surface of the second portion 56 opposite to the substrate 10. In the illustrated example, the upper surface 4 is a flat surface. The second portion 56 is not in contact with the second electrode layer 58 on the opposite side from the substrate 10.

A thickness T2 of the second portion 56 is greater than the thickness T1 of the first portion 55. The thickness T2 of the second portion 56 is, for example, constant in the in-plane direction. The thickness T2 of the second portion 56 is, for example, 50 nm or more and 200 nm or less, may be 70 nm or more and 150 nm or less, and may be 100 nm. Note that the term "thickness T2 of the second portion 56" is a size of the second portion 56 of the upper surface of the column portion 30 provided with the second portion 56 in the normal N direction, and is the smallest size.

A sheet resistance (surface resistivity) of the second portion 56 may be higher than a sheet resistance of a connecting portion 59 where the first portion 55 and the second electrode layer 58 are coupled, but may be equal to the sheet resistance of the connecting portion 59 or lower than the sheet resistance of the connecting portion 59. Note that a size of the first portion 55 in the in-plane direction, and a size of the second portion 56 in the in-plane direction are not particularly limited.

The second electrode layer 58 is coupled to the first electrode layer 54. The second electrode layer 58 is provided on the opposite side of the first electrode layer 54 from the substrate 10. The second electrode layer 58 is provided on the first electrode layer 54. Furthermore, the second electrode layer 58 is provided on the insulating layer 40 and on the inner surface of the contact hole 42. The term "inner surface of the contact hole 42" is a side surface 41 of the insulating layer 40 to define the contact hole 42. In the illustrated example, the side surface 41 is inclined with respect to the stacking direction. The insulating layer 40 is provided between the first electrode layer 54 and the second electrode layer 58. In the example illustrated in FIG. 2, the planer shape of the second electrode layer 58 is a circle. The second electrode layer 58 is coupled to the wiring 60.

A thickness T3 of the second electrode layer 58 is, for example, 100 nm or more and 500 nm or less, may be 200 nm or more and 400 nm or less, and may be 300 nm. The thickness T2 of the second portion 56 is, for example, less than the thickness T3 of the second electrode layer 58. Note that the term "thickness T3 of the second electrode layer 58" is a size of the second electrode layer 58 of the upper surface of the column portion 30 provided with the second electrode layer 58 via the first electrode layer 54 in the normal N direction, and is the smallest size.

The second electrode layer 58 is made of, for example, a transparent electrode material such as indium tin oxide (ITO) and indium zinc oxide (IZO). A work function of the second electrode layer 58 is, for example, smaller than a work function of the first electrode layer 54. The work function of the first electrode layer 54 is, for example, smaller than a work function of the second semiconductor layer 36.

1.3. Action an Effect

A substrate 10, a plurality of column portions 30 each including a first semiconductor layer 32 of a first conductivity type, a second semiconductor layer 36 of a second conductivity type different from the first conductivity type, and a light-emitting layer 34 provided between the first semiconductor layer 32 and the second semiconductor layer 36, and the second electrode 52 including a first electrode layer 54 electrically coupled to the second semiconductor layer 36 of each of the plurality of column portions 30, and a second electrode layer 58 provided on the opposite side of the first electrode layer 54 from the substrate 10 and having an electrical resistivity lower than an electrical resistivity of the first electrode layer 54 are included. The first electrode layer 54 includes the first portion 55 in contact with the second electrode layer 58 on the opposite side from the substrate 10, and the second portion 56 that is not in contact with the second electrode layer 58 on the opposite side from the substrate 10, and is larger in thickness than the first portion 55.

Thus, in the light-emitting device 100, for example, a difference between the thickness of the connecting portion 59 between the first portion 55 and the second electrode layer 58 and the thickness of the second portion 56 can be reduced, as compared with when the thickness of the second portion is the same as the thickness of the first portion. As a result, a difference between the sheet resistance of the connecting portion 59 and the sheet resistance of the second portion 56 can be reduced. Thus, a difference in the injection current amount between the column portion 30 overlapping the connecting portion 59 and the column portion 30 overlapping the second portion 56 can be reduced when viewed from the stacking direction. As a result, the light emission unevenness can be reduced. Furthermore, the change in the emission wavelength due to the difference in the injection current amount can be suppressed.

In the light-emitting device 100, the work function of the first electrode layer 54 is smaller than the work function of the second semiconductor layer 36, and the work function of the second electrode layer 58 is smaller than the work function of the first electrode layer 54. Thus, in the light-emitting device 100, an energy barrier between the first electrode layer 54 and the second semiconductor layer 36, and an energy barrier between the second electrode layer 58 and the first electrode layer 54 can be reduced in a stepwise manner. As a result, the current can be allowed to easily flow from the second electrode layer 58 toward the second semiconductor layer 36.

In the light-emitting device 100, the thickness T2 of the second portion 56 is less than the thickness T3 of the second electrode layer 58, the first electrode layer 54 is made of the metal material, and the second electrode layer 58 is made of the transparent electrode material. Thus, in the light-emitting device 100, the amount of light transmitted through the second portion 56 can be increased as compared with, for example, when the thickness T2 is greater than the thickness T3.

2. Method of Manufacturing Light-Emitting Device

Figure 4:
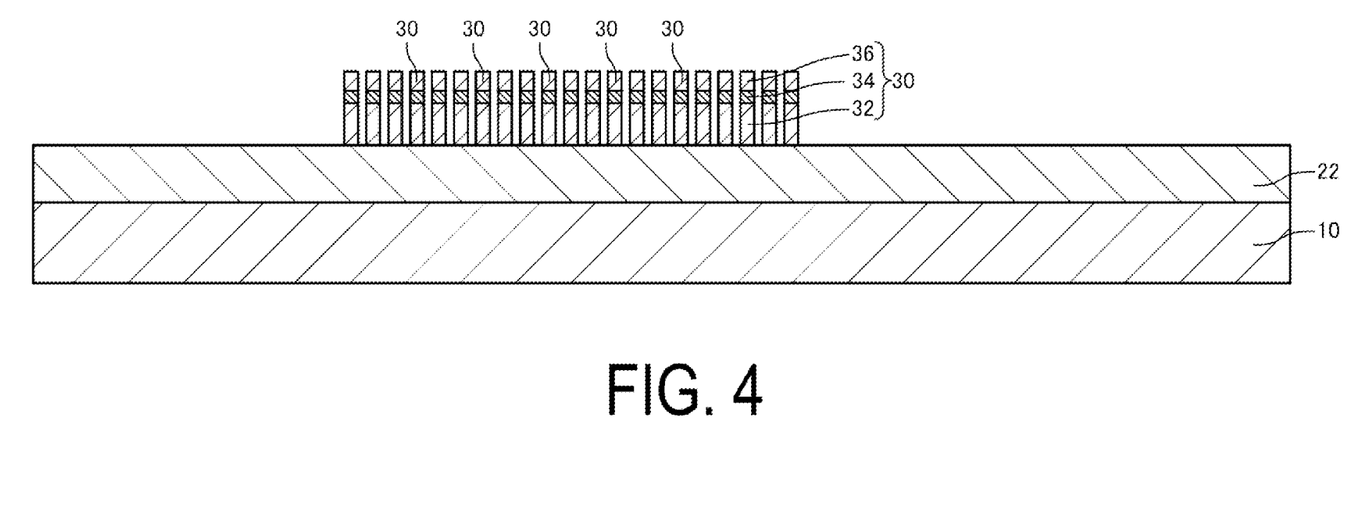
FIG. 4 is a cross-sectional view schematically illustrating a manufacturing process of the light-emitting device according to the present embodiment.
Figure 5:
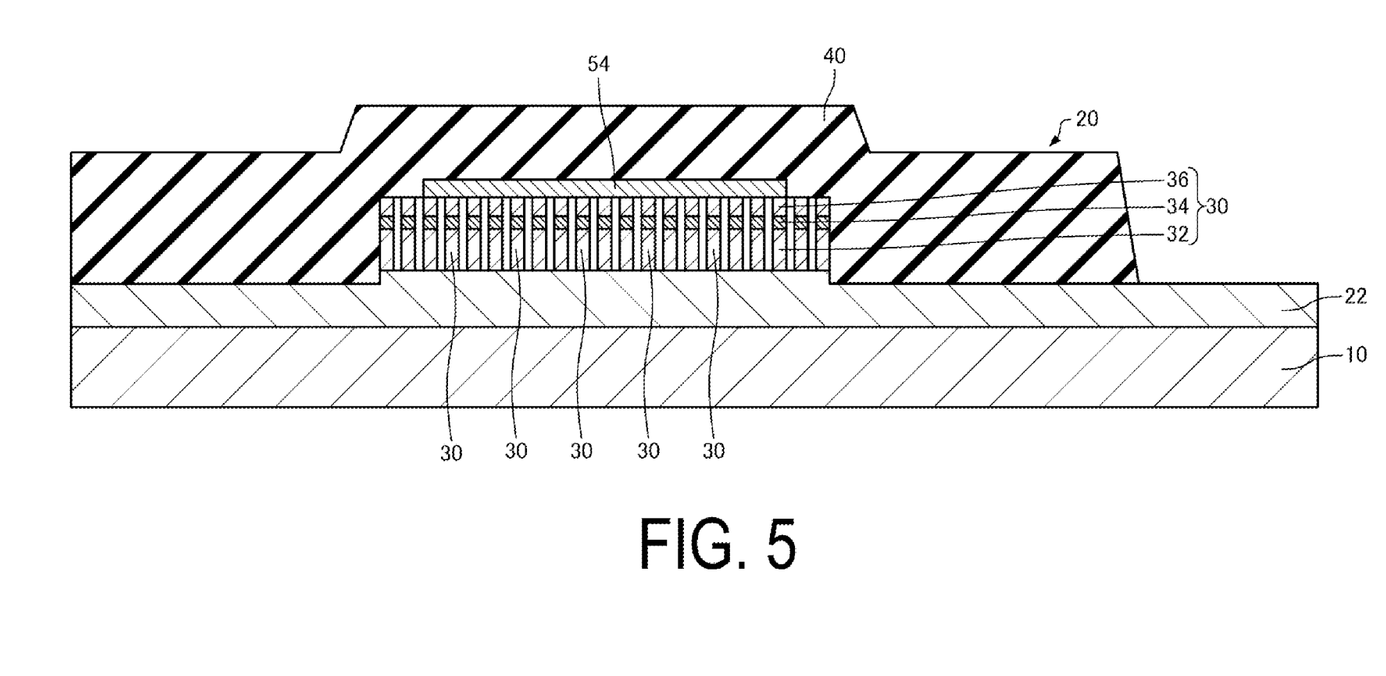
FIG. 5 is a cross-sectional view schematically illustrating a manufacturing process of the light-emitting device according to the present embodiment.
Figure 6:
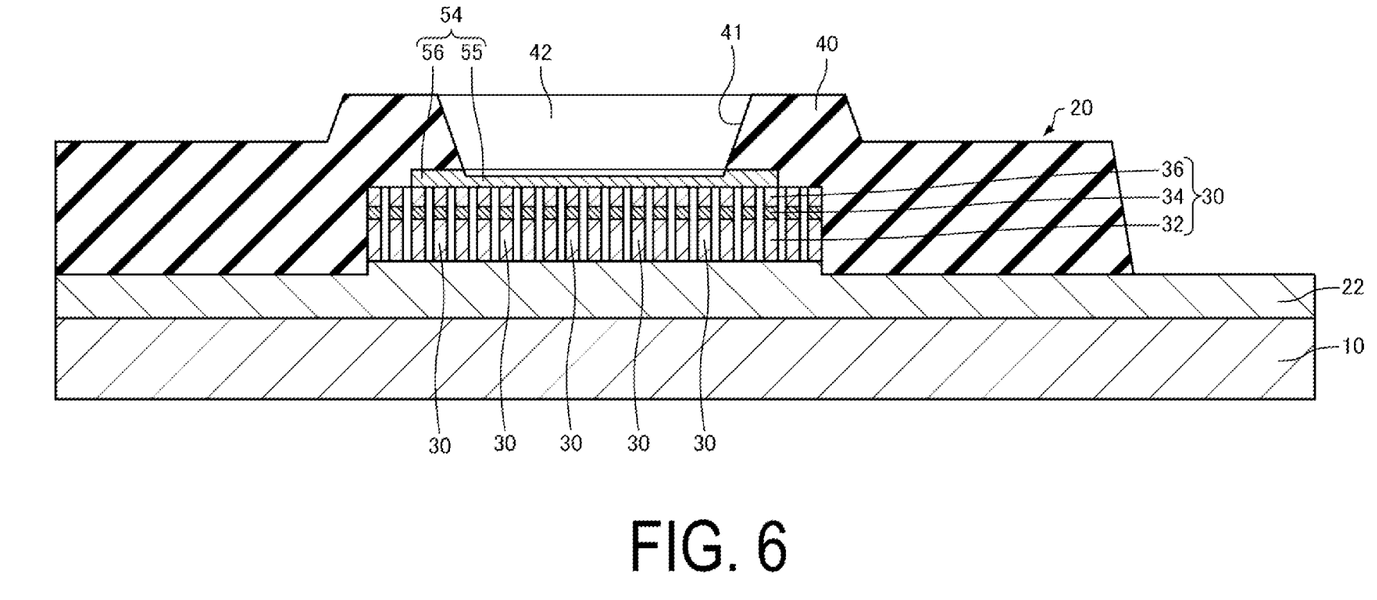
FIG. 6 is a cross-sectional view schematically illustrating a manufacturing process of the light-emitting device according to the present embodiment.

Next, a method of manufacturing the light-emitting device 100 according to the present embodiment will be described with reference to the accompanying drawings. FIGS. 4 to 6 are cross-sectional views schematically illustrating the method of manufacturing the light-emitting device 100 according to the present embodiment.

As illustrated in FIG. 4, the buffer layer 22 is epitaxially grown on the substrate 10. Examples of a method of epitaxial growth include a Metal Organic Chemical Vapor Deposition (MOCVD) method, and a Molecular Beam Epitaxy (MBE) method.

Next, the mask layer (not illustrated) is formed on the buffer layer 22. The mask layer is formed, for example, by electron beam vapor deposition or sputtering.

Next, the mask layer is used as a mask, and the first semiconductor layer 32, the light-emitting layer 34, and the second semiconductor layer 36 are epitaxially grown on the buffer layer 22 in this order. Examples of the method of epitaxial growth include the MOCVD method and the MBE method. According to the present process, the plurality of column portions 30 can be formed. Note that, after forming the plurality of column portions 30, a portion of the buffer layer 22 may be engraved by etching.

As illustrated in FIG. 5, the first electrode layer 54 is formed on the plurality of column portions 30. The first electrode layer 54 is formed, for example, by sputtering and vacuum vapor deposition.

Next, the insulating layer 40 is formed so as to cover the plurality of column portions 30 and the first electrode layer 54. The insulating layer 40 is formed by a spin coating method, a Chemical Vapor Deposition (CVD) method, or the like.

As illustrated in FIG. 6, the insulating layer 40 is patterned to form the contact hole 42 in the insulating layer 40. Patterning is performed by, for example, photolithography and etching. By performing over-etching during the patterning, the portion of the first electrode layer 54 can be engraved, and thus the first electrode layer 54 including the first portion 55 and the second portion 56 can be formed. The etching may be dry etching or wet etching, but the dry etching has a large etching rate with respect to the first electrode layer 54, and thus the processing time can be shortened.

As illustrated in FIG. 1, the second electrode layer 58 is formed on the first portion 55 of the first electrode layer 54, on the inner surface of the contact hole 42, and on the upper surface of the insulating layer 40. The second electrode layer 58 is formed, for example, by sputtering, vacuum vapor deposition, or the like. According to the present process, the second electrode 52 including the first electrode layer 54 and the second electrode layer 58 can be formed.

Next, the first electrode 50 is formed on the buffer layer 22. The first electrode 50 is formed by, for example, sputtering, vacuum vapor deposition, or the like. Note that the order of the process of forming the first electrode 50 and the process of forming the second electrode layer 58 is not particularly limited.

According to the above processes, the light-emitting device 100 can be manufactured.

3. Variation of Light-Emitting Device 3.1. First Variation

Figure 7:
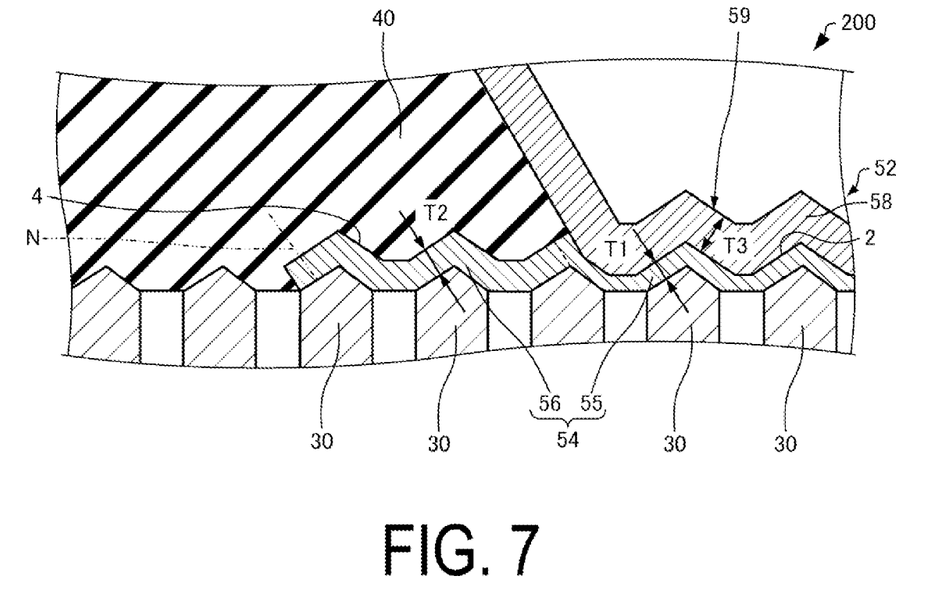
FIG. 7 is a cross-sectional view schematically illustrating the light-emitting device according to a first variation of the present embodiment.

Next, a light-emitting device 200 according to a first variation of the present embodiment will be described with reference to the accompanying drawings. FIG. 7 is a cross-sectional view schematically illustrating the light-emitting device 200 according to the first variation of the present embodiment.

Hereinafter, in the light-emitting device 200 according to the first variation of the present embodiment, members having the same functions as components of the light-emitting device 100 according to the present embodiment described above are denoted by the same reference numerals, and the detailed description thereof is omitted. The same applies to the light-emitting device according to the second and third variations described below of the present embodiment.

As illustrated in FIG. 3, in the light-emitting device 100 described above, the upper surface of the column portion 30 is composed of the c-plane.

In contrast, as illustrated in FIG. 7, in the light-emitting device 200, the upper surface of the column portion 30 is composed of a faceted surface. The upper surface of the column portion 30 is inclined with respect to the upper surface of the substrate 10. The normal N direction of the upper surface of the column portion 30 is inclined with respect to the stacking direction. By controlling a temperature and a film formation speed when the column portion 30 is epitaxially grown, the upper surface of the column portion 30 can be composed of the faceted surface or can be composed of the c-plane.

3.2. Second Variation

Figure 8:
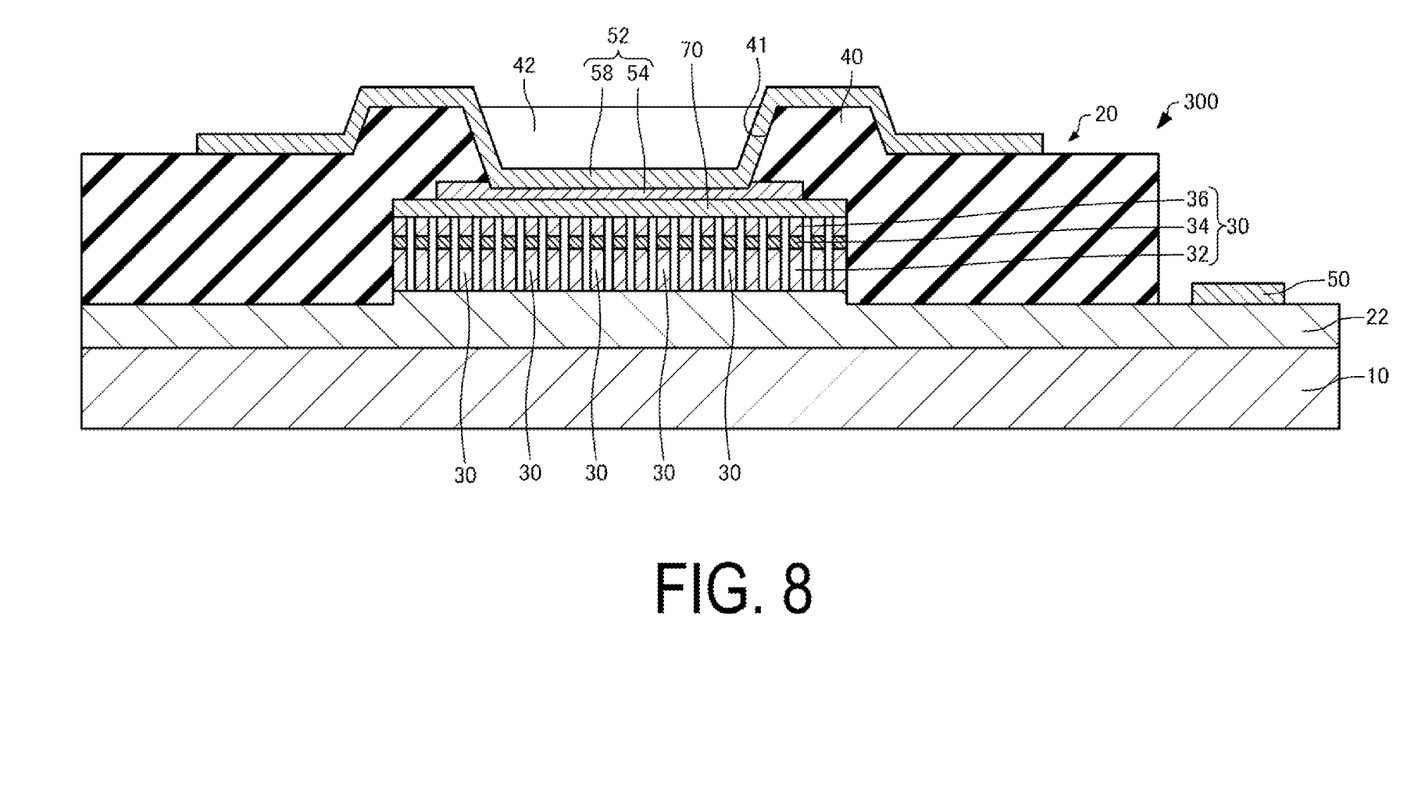
FIG. 8 is a cross-sectional view schematically illustrating the light-emitting device according to a second variation of the present embodiment.

Next, a light-emitting device 300 according to a second variation of the present embodiment will be described with reference to the accompanying drawings. FIG. 8 is a cross-sectional view schematically illustrating the light-emitting device 300 according to the second variation of the present embodiment.

As illustrated in FIG. 8, in the light-emitting device 300, the stack body 20 differs from the light-emitting device 100 described above in that the stack body 20 includes a third semiconductor layer 70.

The third semiconductor layer 70 is provided on the plurality of column portions 30. The third semiconductor layer 70 is provided across the plurality of column portions 30. The third semiconductor layer 70 is provided between the plurality of column portions 30 and the first electrode layer 54. The third semiconductor layer 70 may be in ohmic contact with the first electrode 54.

The third semiconductor layer 70 is a semiconductor layer of the second conductivity type that is the same as the conductivity type of the second semiconductor layer 36. The third semiconductor layer 70 is, for example, a p-type GaN layer doped with Mg. The second electrode 52 is electrically coupled to the second semiconductor layer 36 via the third semiconductor layer 70. The third semiconductor layer 70 is formed by, for example, epitaxial growth. Examples of the method of epitaxial growth include the MOCVD method and the MBE method.

The light-emitting device 300 includes the third semiconductor layer 70 of the second conductivity type provided between the plurality of column portions 30 and the first electrode layer 54. Thus, in the light-emitting device 300, when the first electrode layer 54 is formed, intrusion of the electrode material between adjacent ones of the column portions 30 can be suppressed. Furthermore, as compared with when the third semiconductor layer 70 is not provided, a distance between the light-emitting layer 34 and the first electrode layer 54 can be increased. Thus, when the light generated in the light-emitting layer 34 propagates in the in-plane direction, the light absorbed by the first electrode layer 54 can be reduced.

3.3. Third Variation

Figure 9:
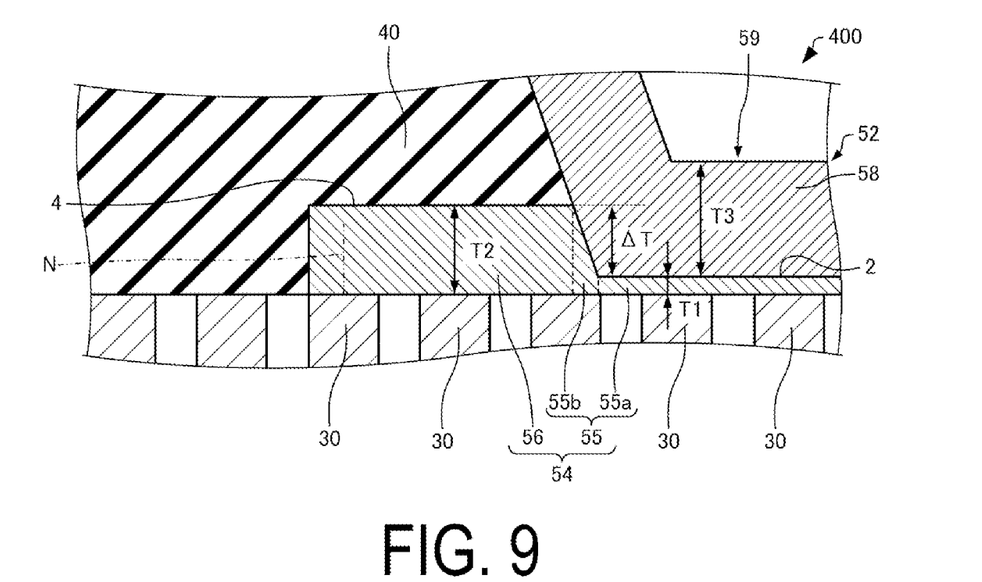
FIG. 9 is a cross-sectional view schematically illustrating the light-emitting device according to a third variation of the present embodiment.

Next, a light-emitting device 400 according to a third variation of the present embodiment will be described with reference to the accompanying drawings. FIG. 9 is a cross-sectional view schematically illustrating the light-emitting device 400 according to the third variation of the present embodiment.

As illustrated in FIG. 9, in the light-emitting device 400, as compared with the light-emitting device 100, the thickness T1 of the first portion 55 of the first electrode layer 54 is small. In the illustrated example, the thickness T1 of the first portion 55 is less than a difference ΔT between the thickness T2 of the second portion 56 and the thickness T1 of the first portion 55. For example, the thickness T1 can be made less than the difference ΔT by increasing the over-etching time when forming the contact hole 42.

In the light-emitting device 400, the thickness T1 of the first portion 55 is less than the difference ΔT between the thickness T2 of the second portion 56 and the thickness T1 of the first portion 55. Thus, as compared with when the thickness T1 is greater than the difference ΔT, the sheet resistance of the first portion 55 can be increased.

4. Projector

Figure 10:
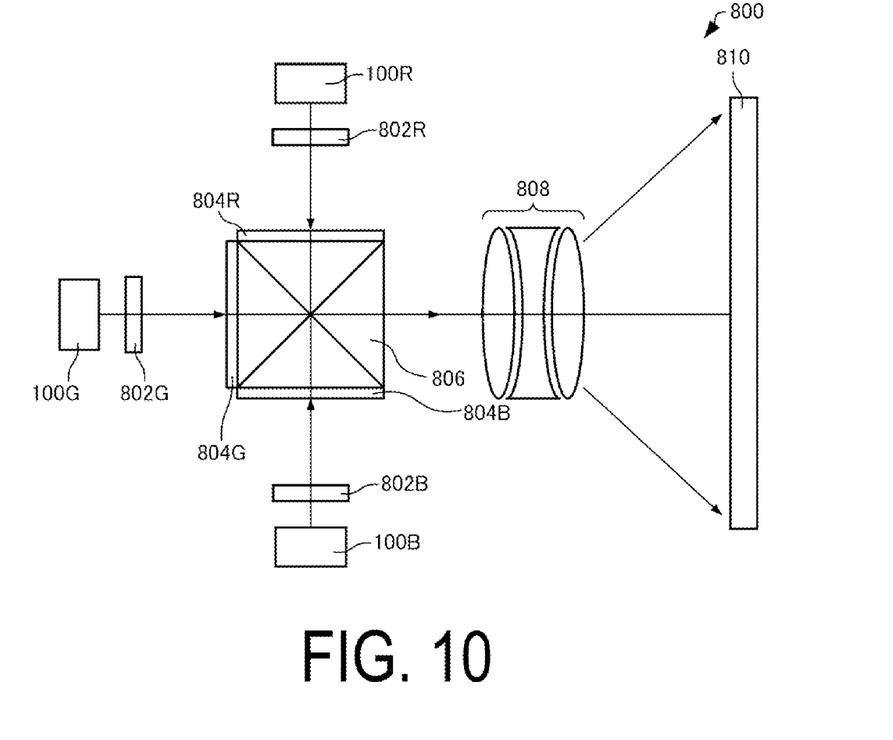
FIG. 10 is a view schematically illustrating a projector according to the present embodiment.

Next, a projector according to the present embodiment will be described with reference to the accompanying drawings. FIG. 10 is a view schematically illustrating a projector 800 according to the present embodiment.

The projector 800 includes, for example, the light-emitting device 100 as a light source.

The projector 800 includes a housing (not illustrated) and a red light source 100R, a green light source 100G, and a blue light source 100B that emit red light, green light, and blue light, respectively, included in the housing. Note that for the sake of convenience, in FIG. 10, the red light source 100R, the green light source 100G, and the blue light source 100B are simplified.

The projector 800 further includes a first optical element 802R, a second optical element 802G, a third optical element 802B, a first optical modulation device 804R, a second optical modulation device 804G, a third optical modulation device 804B, and a projection device 808, which are provided in the housing. The first optical modulation device 804R, the second optical modulation device 804G, and the third optical modulation device 804B are, for example, a transmission type liquid crystal light valve. The projection device 808 is, for example, a projection lens.

Light emitted from the red light source 100R is incident on the first optical element 802R. The light emitted from the red light source 100R is focused by the first optical element 802R. Note that the first optical element 802R may have a function other than the focusing. The same applies to the second optical element 802G and the third optical element 802B described below.

The light focused by the first optical element 802R is incident on the first optical modulation device 804R. The first optical modulation device 804R modulates the incident light in accordance with image information. Then, the projection device 808 enlarges an image formed by the first optical modulation device 804R and projects the image to a screen 810.

Light emitted from the green light source 100G is incident on the second optical element 802G. The light emitted from the red light source 100G is focused by the second optical element 802G.

The light focused by the second optical element 802G is incident on the second optical modulation device 804G. The second optical modulation device 804G modulates the incident light in accordance with image information. Then, the projection device 808 enlarges an image formed by the second optical modulation device 804G and projects the image to the screen 810.

Light emitted from the blue light source 100B is incident on the third optical element 802B. The light emitted from the blue light source 100B is focused by the third optical element 802B.

The light focused by the third optical element 802B is incident on the third optical modulation device 804B. The third optical modulation device 804B modulates the incident light in accordance with image information. Then, the projection device 808 enlarges an image formed by the third optical modulation device 804B and projects the image to the screen 810.

Also, the projector 800 can include a cross dichroic prism 806 that synthesizes the light emitted from the first optical modulation device 804R, the second optical modulation device 804G, and the third optical modulation device 804B and guides the emitted light to the projection device 808.

Light of three colors modulated respectively by the first optical modulation device 804R, the second optical modulation device 804G, and the third optical modulation device 804B is incident on the cross dichroic prism 806. The cross dichroic prism 806, is formed by bonding four right-angle prisms together, and a dielectric multilayer film configured to reflect the red light and a dielectric multilayer film configured to reflect the blue light are arranged on inner surfaces of the prisms. The three types of color light are synthesized by these dielectric multilayer films, and light representing a color image is formed. Then, the synthesized light is projected onto the screen 810 by the projection device 808, and an enlarged image is displayed.

Note that the red light source 100R, the green light source 100G, and the blue light source 100B may directly form the image by controlling the light-emitting device 100 as a pixel of the image in accordance with the image information without using the first optical modulation device 804R, the second optical modulation device 804G, and the third optical modulation device 804B. Then, the projection device 808 may enlarge the image formed by the red light source 100R, the green light source 100G, and the blue light source 100B to project the image to the screen 810.

In addition, in the example described above, the transmissive type liquid crystal light valve is used as the optical modulation device, but a light valve other than the liquid crystal may be used, or a reflective type light valve may be used. Examples of such a light valve include a reflective type liquid crystal light valve or a digital micromirror device. Also, a configuration of the projection device is changed as appropriate depending on the type of the light valve used.

Further, the light source can also be applied to a light source device of a scanning type image display device including scanning unit, which is an image forming apparatus that causes an image of a desired size to be displayed on the display surface by performing scanning on the screen with light from the light source.

5. Display

Figure 11:
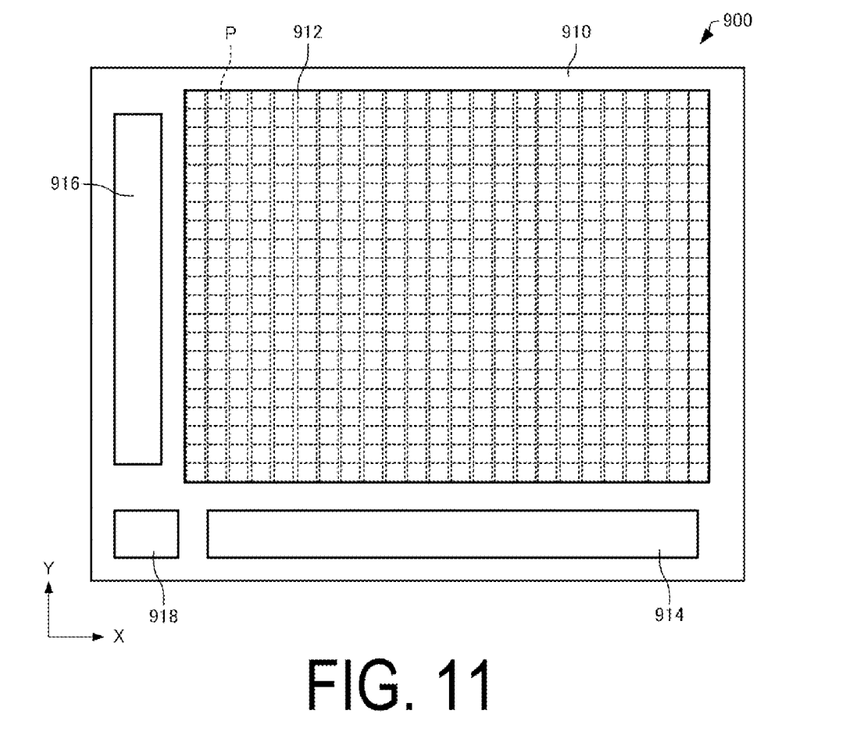
FIG. 11 is a plan view schematically illustrating a display according to the present embodiment.
Figure 12:
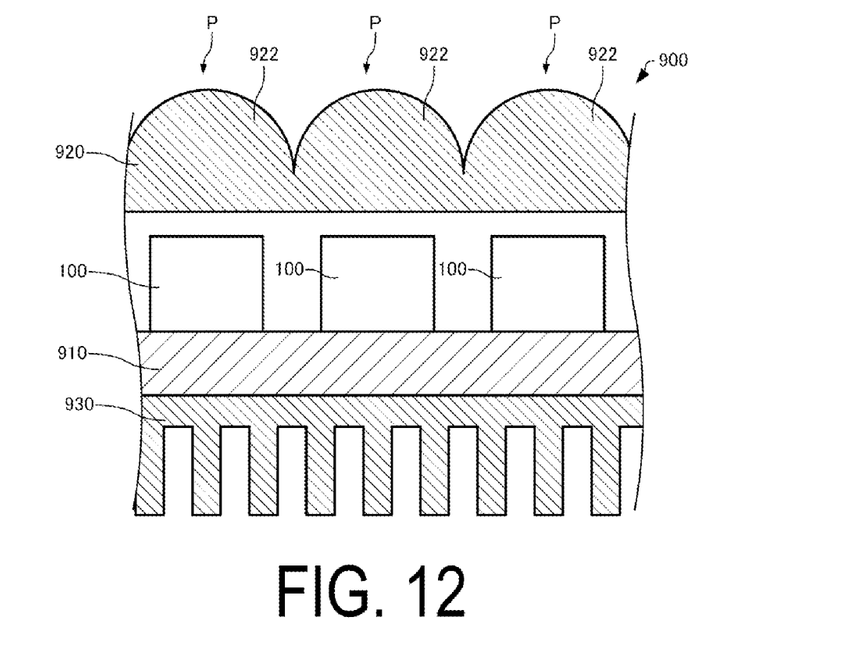
FIG. 12 is a cross-sectional view schematically illustrating the display according to the present embodiment.

Next, a display according to the present embodiment will be described with reference to the accompanying drawings. FIG. 11 is a plan view schematically illustrating a display 900 according to the present embodiment. FIG. 12 is a cross-sectional view schematically illustrating the display 900 according to the present embodiment. Note that, in FIG. 11, for the sake of convenience, an X-axis and a Y-axis are illustrated as two axes perpendicular to each other.

The display 900 includes, for example, the light-emitting device 100 as the light source.

The display 900 is a display device that displays an image. The image includes an image that displays only character information. The display 900 is a self-light emission type display. The display 900 includes a printed wired board 910, a lens array 920, and a heat sink 930, as illustrated in FIGS. 11 and 12.

A driving circuit for driving the light-emitting device 100 is mounted on the printed wired board 910. The driving circuit is a circuit including, for example, a Complementary Metal Oxide Semiconductor (CMOS). The driving circuit drives the light-emitting device 100 based on input image information, for example. Although not illustrated, a light-transmitting substrate for protecting the printed wired board 910 is disposed on the printed wired board 910.

The printed wired board 910 includes a display region 912, a data line driving circuit 914, a scanning line driving circuit 916, and a control circuit 918.

The display region 912 includes a plurality of pixels P. The plurality of pixel P are arranged along the X-axis and the Y-axis in the illustrated example.

Although not illustrated, a plurality of scanning lines and a plurality of data lines are provided in the printed wired board 910. For example, the scanning lines extend along the X-axis and the data lines extend along the Y-axis. The scanning lines are coupled to the scanning line driving circuit 916. The data lines are coupled to the data line driving circuit 914. The pixel P is provided to correspond to an intersection between the scanning line and the data line.

One pixel P includes, for example, one light-emitting device 100, one lens 922, and a pixel circuit (not illustrated). The pixel circuit includes a switching transistor that functions as a switch of the pixel P, a gate of the switching transistor is coupled to the scanning line, and one of a source or a drain is coupled to the data line.

The data line driving circuit 914 and the scanning line driving circuit 916 are circuits that control drive of the light-emitting device 100 constituting the pixel P. The control circuit 918 is configured to control display of an image.

Image data is supplied from an upper circuit to the control circuit 918. The control circuit 918 supplies various signals based on the image data to the data line driving circuit 914 and the scanning line driving circuit 916.

When the scanning line driving circuit 916 activates a scanning signal to select the scanning line, the switching transistor of the selected pixel P is turned on. At this time, the data line driving circuit 914 supplies the data signal from the data line to the selected pixel P, and thus the light-emitting device 100 of the selected pixel P emits light according to the data signal.

The lens array 920 includes a plurality of the lenses 922. One lens 922 is provided, for example, for one light-emitting device 100. Light emitted from the light-emitting device 100 is incident on the one lens 922.

The heat sink 930 is in contact with the printed wired board 910. A material of the heat sink 930 is, for example, a metal such as copper or aluminum. The heat sink 930 dissipates heat generated by the light-emitting device 100.

The light-emitting device according to the embodiment described above can also be used in applications other than the projector or the display. Examples of the applications other than projector or display include, for example, an indoor/outdoor lighting, a laser printer, a scanner, a vehicle-mounted light, a sensing device using light, and a light source for a communication device. Also, the light-emitting device according to the embodiment described above can be used as a display device for a head-mounted display.

The embodiments and variations described above are examples and are not limited thereto. For example, each embodiment and each variation can be combined as appropriate.

The present disclosure includes a substantially the same configuration as the configurations described in the embodiments, such as a configuration having the same function, method, and result, or a configuration having the same object and effect. Furthermore, the present disclosure includes a configuration in which a non-essential part of the configuration described in the embodiments is replaced. The present disclosure includes a configuration that performs the same action and effect or a configuration that achieves the same purpose as the configurations described in the embodiments. Further, the present disclosure includes a configuration in which a known technology is added to the configurations described in the embodiments.

The following contents are derived from the above-described embodiments and variations.

An aspect of a light-emitting device includes
a substrate,
a plurality of column portions each including a first semiconductor layer of a first conductivity type, a second semiconductor layer of a second conductivity type different from the first conductivity type, and a light-emitting layer provided between the first semiconductor layer and the second semiconductor layer, and
an electrode including a first electrode layer electrically coupled to the second semiconductor layer of each of the plurality of column portions, and a second electrode layer provided on an opposite side of the first electrode layer from the substrate and having an electrical resistivity lower than an electrical resistivity of the first electrode layer, and
the first electrode layer includes a first portion in contact with the second electrode layer on the opposite side from the substrate, and a second portion not in contact with the second electrode layer on the opposite side from the substrate and being thicker than the first portion.

According to this light-emitting device, light emission unevenness can be reduced.

In one aspect of the light-emitting device, the work function of the first electrode layer may be smaller than the work function of the second semiconductor layer, and the work function of the second electrode layer may be smaller than the work function of the first electrode layer.

According to this light-emitting device, a current can be allowed to easily flow from the second electrode layer toward the second semiconductor layer.

In one aspect of the light-emitting device, the thickness of the first portion may be less than the difference between the thickness of the second portion and the thickness of the first portion.

According to this light-emitting device, the sheet resistance of the first portion can be increased.

In one aspect of the light-emitting device, the third semiconductor layer of the second conductivity type provided between the plurality of column portions and the first electrode layer may be included.

According to this light-emitting device, when the first electrode layer is formed, intrusion of the electrode material between adjacent ones of the column portions can be suppressed.

In one aspect of the light-emitting device, the thickness of the second portion may be less than the thickness of the second electrode layer, the first electrode layer may be made of the metal material, and the second electrode layer may be made of the transparent electrode material.

According to this light-emitting device, the amount of light transmitted through the second portion can be increased.

One aspect of the projector includes one aspect of the light-emitting device.

One aspect of the display includes one aspect of the light-emitting device.

What is claimed is:

1. A light-emitting device comprising:
    a substrate;
    a plurality of column portions each including
        a first semiconductor layer of a first conductivity type,
        a second semiconductor layer of a second conductivity type different from the first conductivity type, and
        a light-emitting layer provided between the first semiconductor layer and the second semiconductor layer; and
    an electrode including
        a first electrode layer electrically coupled to the second semiconductor layer of each of the plurality of column portions, and
        a second electrode layer provided on an opposite side of the first electrode layer from the substrate and having an electrical resistivity lower than an electrical resistivity of the first electrode layer, wherein
    the first electrode layer includes
        a first portion being in contact with the second electrode layer on the opposite side from the substrate, and
        a second portion being not in contact with the second electrode layer on the opposite side from the substrate and having a greater thickness than the first portion.

2. The light-emitting device according to claim 1, wherein
    a work function of the first electrode layer is smaller than a work function of the second semiconductor layer, and
    a work function of the second electrode layer is smaller than the work function of the first electrode layer.

3. The light-emitting device according to claim 1, wherein
    a thickness of the first portion is less than a difference between a thickness of the second portion and the thickness of the first portion.

4. The light-emitting device according to claim 1, comprising
    a third semiconductor layer of the second conductivity type provided between the plurality of column portions and the first electrode layer.

5. The light-emitting device according to claim 1, wherein
    a thickness of the second portion is less than a thickness of the second electrode layer,
    the first electrode layer is made of a metal material, and
    the second electrode layer is made of a transparent electrode material.

6. A projector comprising the light-emitting device according to claim 1.

7. A display comprising the light-emitting device according to claim 1.

* * * * *